(12) United States Patent
Wu

(10) Patent No.: US 12,430,661 B2
(45) Date of Patent: Sep. 30, 2025

(54) SYSTEMS AND METHODS FOR PROCESSING PRODUCT INFORMATION USING A MACHINE-LEARNING MODEL

(71) Applicant: SHOPIFY INC., Ottawa (CA)

(72) Inventor: Anbang Wu, Austin, TX (US)

(73) Assignee: SHOPIFY INC., Ottawa (CA)

( * ) Notice: Subject to any disclaimer, the term of this patent is extended or adjusted under 35 U.S.C. 154(b) by 117 days.

(21) Appl. No.: 18/299,305

(22) Filed: Apr. 12, 2023

(65) Prior Publication Data
US 2024/0289823 A1    Aug. 29, 2024

Related U.S. Application Data

(60) Provisional application No. 63/448,896, filed on Feb. 28, 2023.

(51) Int. Cl.
*G06Q 30/0202*    (2023.01)

(52) U.S. Cl.
CPC ............... *G06Q 30/0202* (2013.01)

(58) Field of Classification Search
CPC .............. G06Q 30/0202; G06Q 30/0631
See application file for complete search history.

(56) References Cited

U.S. PATENT DOCUMENTS

| | | | |
|---|---|---|---|
| 2004/0015386 A1* | 1/2004 | Abe | G06Q 30/0239 705/7.29 |
| 2010/0049538 A1* | 2/2010 | Frazer | G06Q 30/0244 705/14.43 |
| 2010/0268661 A1* | 10/2010 | Levy | G06Q 30/02 705/347 |
| 2019/0220694 A1* | 7/2019 | Biswas | G06N 3/08 |
| 2019/0347668 A1* | 11/2019 | Williams | G06F 18/2413 |
| 2020/0074242 A1* | 3/2020 | Chen | G06V 20/62 |
| 2021/0049442 A1 | 2/2021 | Menon et al. | |
| 2021/0304121 A1 | 9/2021 | Lee et al. | |

(Continued)

OTHER PUBLICATIONS

C. Ghanwat, Pratik, et al., "Improved personalized recommendation system with better user experience", 2017 International Conference on Advances in Computing, Communications, and Informatics (ICACCI) (2017, pp. 1216-1221) (Year: 2017).*

(Continued)

*Primary Examiner* — Amber A Misiaszek

(57) ABSTRACT

Although sales history may be used to determine which products are likely to be purchased together, new products or stores may have little to no usable sales history. It is challenging to use the sales history of other products or stores because there is no system for uniquely identifying products that is common to all stores. Aspects of the present disclosure provide systems and methods for processing product information using a machine-learning model to predict the likelihood of products being purchased together. According to some aspects of the present disclosure, product information may be encoded to obtain numerical vectors for input to a machine-learning model to transform product information into a format in which it can be leveraged by the machine-learning model to identify co-purchasing trends that may be common to different stores and/or products.

20 Claims, 11 Drawing Sheets

(56) References Cited

U.S. PATENT DOCUMENTS

2022/0253643 A1   8/2022  Afshar et al.
2022/0327583 A1*  10/2022 Fotso ................. G06Q 30/0282

OTHER PUBLICATIONS

Cer, Daniel, et al. "Universal Sentence Encoder". Apr. 12, 2018. 7 pages.
Yang, Yinfei, et al. "Multilingual Universal Sentence Encoder for Semantic Retrieval". Jul. 9, 2019. 6 pages.
McAuley, Julian, et al. "Inferring Networks of Substitutable and Complementary Products". Jul. 1, 2015. 12 pages.
Google, "universal-sentence-encoder", available at https://tfhub.dev/google/collections/universal-sentence-encoder/1, publication date unknown (not listed on webpage), accessible as of Apr. 10, 2023. Accessed on Apr. 10, 2023. 3 pages.

* cited by examiner

E-Commerce Platform | Q Search | JG John's Apparel / Jonny B. Good

- ⌂ Home
- ↻ Orders
- ◇ Products
- ○○ Customers
- ᏚᏞ Reports
- ⚙ Discounts
- ⊞ Apps SALES CHANNELS ⊕
- 🏪 Online Store ◇
- ▢ Mobile App View all channels ⚙ Settings All channels ⌄ | Today ⌄

TOTAL SALES
$98.00

$125
$75
$25

12am    8pm    4pm    11pm
                              Jun 1
                              2 orders

TOTAL SALES BY CHANNEL    View dashboard

Online Store                                Jun 1
$0.00                                       0 orders Mobile app
$0.00                                       0 orders Shopify POS (126 York St.)
$0.00                                       0 orders

Good afternoon, Jonny B..
Here's what's happening with your store today.

Today's total sales    Today's visits
$98.00                 1

- Update your Platform Payments tax details
  We require additional information to verify your identity.
  [Update tax details]

- Advanced Cash on Delivery has been deactivated for your store
  [See why]

FIG. 2

| Vector pair | | Co-purchase probability |
|---|---|---|
| Numeric vector 1 (Umbrella) | Numeric vector 2 (Rainboots) | 10% |
| Numeric vector 1 (Umbrella) | Numeric vector 3 (Raincoat) | 8% |
| Numeric vector 1 (Umbrella) | Numeric vector 4 (Sweater) | 5% |
| Numeric vector 4 (Sweater) | Numeric vector 2 (Rainboots) | 4% |
| Numeric vector 3 (Raincoat) | Numeric vector 2 (Rainboots) | 9% |

FIG. 8

| Product ID pair | | Co-purchase probability |
|---|---|---|
| Product ID 1 (Umbrella) | Product ID 2 (Rainboots) | 10% |
| Product ID 1 (Umbrella) | Product ID 3 (Raincoat) | 8% |
| Product ID 1 (Umbrella) | Product ID 4 (Sweater) | 5% |
| Product ID 4 (Sweater) | Product ID 2 (Rainboots) | 4% |
| Product ID 3 (Raincoat) | Product ID 2 (Rainboots) | 9% |

FIG. 9

SYSTEMS AND METHODS FOR PROCESSING PRODUCT INFORMATION USING A MACHINE-LEARNING MODEL

CROSS-REFERENCE TO RELATED APPLICATION

The present application claims the benefit of U.S. Provisional Patent Application No. 63/448,896, filed on Feb. 28, 2023.

FIELD

The present application relates to the application of machine-learning to product information.

BACKGROUND

Sales history indicating which products have previously been bought together may be used to determine a relevant product recommendation (e.g. for a co-purchase or a subsequent purchase) for a customer when they select a product to purchase.

SUMMARY

New products or stores may have little to no usable sales history, making it challenging to provide relevant recommendations. One way of obtaining a product recommendation for a store with little or no usable sales history is to use the sales history from another store to inform the recommendation. However, there may be no system for uniquely identifying products that is common to all stores. That is, each store may be using its own set of product identifiers to uniquely identify its products. Moreover, a new store might not sell the exact same products as an existing store. As a result, it may not be possible to map recommendations for products in an existing store to the products of a new store. Additionally, when a store introduces new products, they may have new product identifiers and there may be no sales history available for those particular identifiers. For example, scarves in new colours may be introduced in Fall 2023, but the Fall 2023 scarves may have different product identifiers from the Fall 2022 scarves.

In order to develop a product recommendation model that is applicable to stores and/or products without any usable sales history, product information for a set of products is encoded to obtain, for each product, a respective numeric vector. In some embodiments, the encoding is based on a form of embedding (e.g. character, word, and/or sentence embedding), feature extraction, or some other scheme for vectorization. The product information may include, for example, a title, a product image, a product description, a product type etc. The numeric vectors of different products are paired together and labelled according to whether or not the products have previously been purchased together. The labelled pairs are used to train a machine-learning model for predicting the likelihood of pairs of products being purchased together.

In use, product information for products of a particular store may be encoded and paired before being input to the trained machine-learning model in order to predict the likelihood of pairs of products being purchased together. When a customer selects a product for purchase from a store, another product may be recommended to the customer based on the likelihoods provided by the trained machine-learning model.

Technical benefits include the development of a machine-learning model for identifying pairs of products that are likely to be purchased together that is applicable to different stores and/or products, regardless of whether any usable sales history is available for those stores and/or products. The trained machine-learning model can use product information, such as text describing a product (e.g. that would be for use on a product web page), to determine a probability of co-purchase, rather than relying on sales history.

Stores typically have databases of product information that is indicative of the characteristics (e.g. properties, intended use, category etc.) of the stores' products e.g. for display on their websites. By encoding product information to obtain numerical vectors for input to a machine-learning model, this wealth of product information is transformed into a format in which it can be leveraged by the machine-learning model to identify co-purchasing trends that are common to e.g. different stores and products. This allows for developing a machine-learning model using available sales history that may be implemented for stores without any usable sales history (e.g. new stores) and/or for new products. This avoids the need to separately develop and train a new machine-learning model for each new store. The machine-learning model may also be used to suggest recommendations for products that are new to a particular store without requiring retraining for the new products.

In addition, the machine-learning model may be trained and used with different types of product information. For example, even if the machine-learning model may be trained based on product information that includes a title and a description for each product, it may still work for products which have a title but no product information. This can further reduce the time taken to implement product recommendations for a new store or a new product, as it may reduce the need to, for example, add new product descriptions for all of the products of the new store in order to obtain co-purchase recommendations for the new store.

As a further advantage, the machine-learning model is trainable using data from multiple stores, resulting in a larger training set. This may allow for detecting rarer co-purchasing events, allowing emerging co-purchasing trends to be identified more quickly.

In some embodiments, a computer-implemented method is provided. The computer-implemented method may comprise encoding, for each product in a first set of products, respective product information to obtain a respective numeric vector for that product. The computer-implemented method may comprise pairing the numeric vectors to obtain a first set of vector pairs, each vector pair in the first set of vector pairs corresponding to a respective pair of products from the first set of products. The computer-implemented method may comprise inputting the first set of vector pairs into a machine-learning model to obtain, for each pair in the first set of vector pairs, probability information indicating whether the respective pair of products corresponding to the respective vector pair are likely to be purchased together.

The computer-implemented method may also comprise obtaining the machine-learning model. The obtained machine-learning model may have been trained by encoding, for each product in a second set of products, respective product information to obtain a respective numeric vector for that product, pairing the numeric vectors for the second set of products to obtain a second set of vector pairs, each vector pair in the second set of vector pairs corresponding to a respective pair of products in the second set of products, labelling the second set of vector pairs to obtain, for each vector pair in the second set of vector pairs, a label indicative of whether or not the respective pair of products associated with the vector pair have been purchased together, creating a training set using the set of labels and the second set of vector pairs, and training the machine-learning model using the training set.

Training the machine-learning model using the training set may comprise training the machine-learning model using the training set and co-purchase frequency information, the co-purchase frequency information indicating how frequently products have been purchased together. Training the machine-learning model using the training set and co-purchase frequency information may comprise training the machine-learning model using a loss function that is based on the co-purchase frequency information. Creating the training set using the set of labels and the second set of vector pairs may comprise omitting, from the training set, at least some vector pairs in the second set of vector pairs that are associated with a label indicating that the respective pair of products have not been purchased together. The first set of products may be from a first online store and the second set of products may be from a second online store. The first set of products may include at least one product that is not in the second set of products. The machine-learning model may comprise a neural network.

The product information may comprise textual product information for each product in the first set of products, e.g. the textual product information for a product may comprise text describing the product for use in web content (e.g. a web page) associated with the product. For each product in the first set of products, the respective numeric vector may be based on one or more words in the textual product information for that product. For each product in the first set of products, the respective numeric vector may be based on a meaning of a sequence of words in the textual product information for that product.

The machine-learning model may comprise a first machine-learning model. Encoding, for each product in the first set of products, the respective textual product information to obtain the respective numeric vector for that product may comprise encoding, for each product in the first set of products, the respective textual product information with a second machine-learning model that uses transfer learning via sentence embeddings to obtain the respective numeric vector for that product.

The computer-implemented method may further comprise receiving, from a user device over a network, an indication that a customer intends to purchase a particular product in the first set of products, the first set of vector pairs including at least one vector pair that includes the numeric vector for the particular product. The computer-implemented method may further comprise, based on the probability information for the at least one vector pair, providing a product recommendation for output to customer at a user interface of the user device.

Pairing the numeric vectors to obtain a first set of vector pairs may comprise, for each vector pair in the first set of vector pairs, concatenating a first numeric vector in the vector pair and a second numeric vector in the vector pair.

A system is also disclosed that is configured to perform the methods disclosed herein, such as any of the methods described above. For example, the system may include at least one processor to directly perform (or cause the system to perform) the method steps. In some embodiments, the system may further include a memory storing processor-executable instructions that are executed by the processor to cause the system to perform the methods disclosed herein.

In another embodiment, there is provided a computer readable medium having stored thereon computer-executable instructions that, when executed by a computer, cause the computer to perform operations of the methods disclosed herein, such as operations of the methods described above. The computer readable medium may be non-transitory.

BRIEF DESCRIPTION OF THE DRAWINGS

Embodiments will be described, by way of example only, with reference to the accompanying figures wherein:

FIG. 2 illustrates a home page of an administrator, according to one embodiment;

FIGS. 8 and 9 show examples of probability information according to embodiments of the disclosure;

DETAILED DESCRIPTION

For illustrative purposes, specific example embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
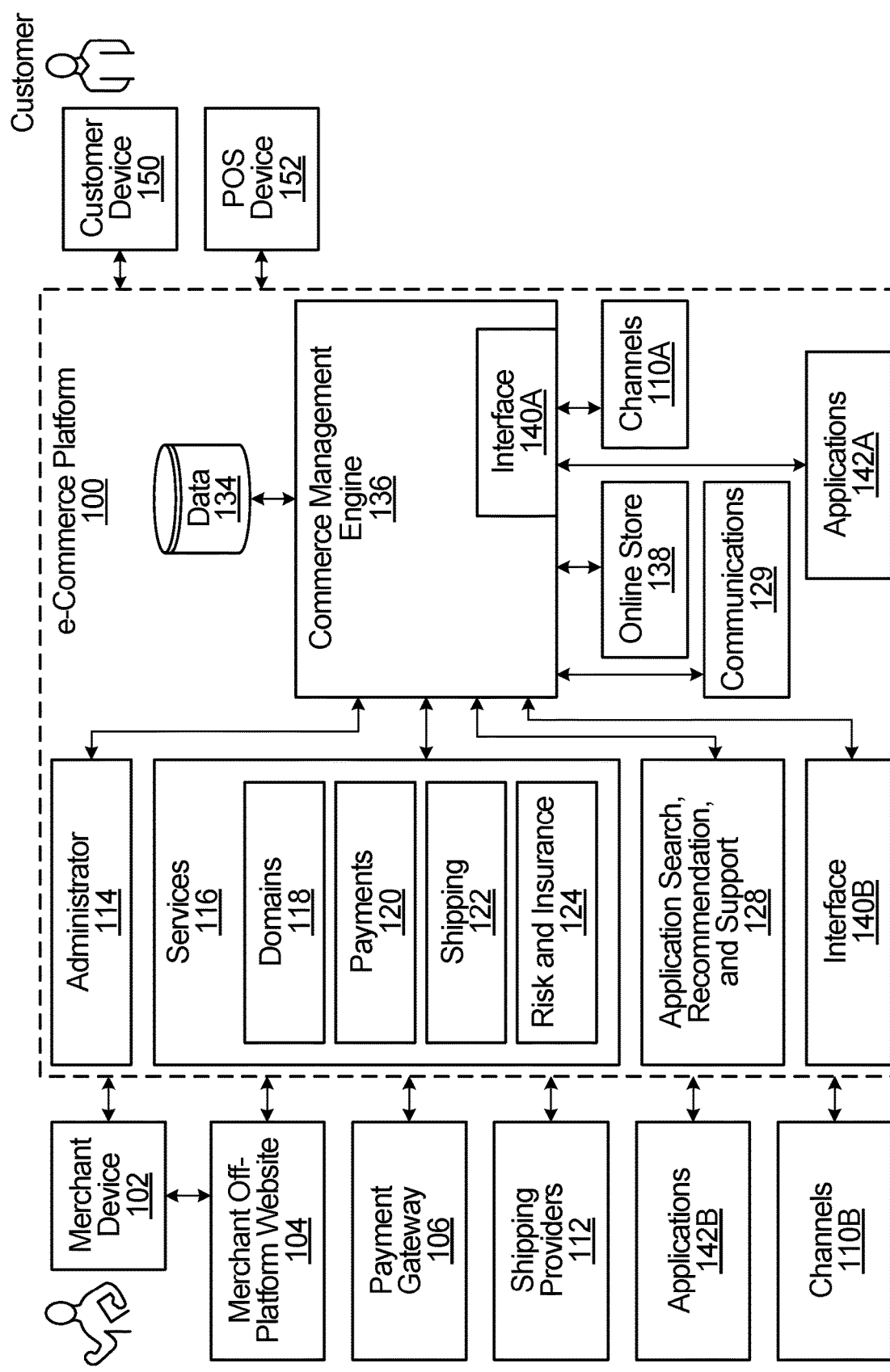
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. . . . In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Predicting the Probability of Products being Purchased Together in the e-Commerce Platform 100

Although sales history may be used to determine which products are likely to be purchased together, new products or stores may have little to no usable sales history. It is challenging to use the sales history of other products or stores because there is no system for uniquely identifying products that is common to all stores. Even if such a system existed, it may not be clear how the sales history for existing products may be indicative of the likelihood of new products being purchased together.

Figure 3:
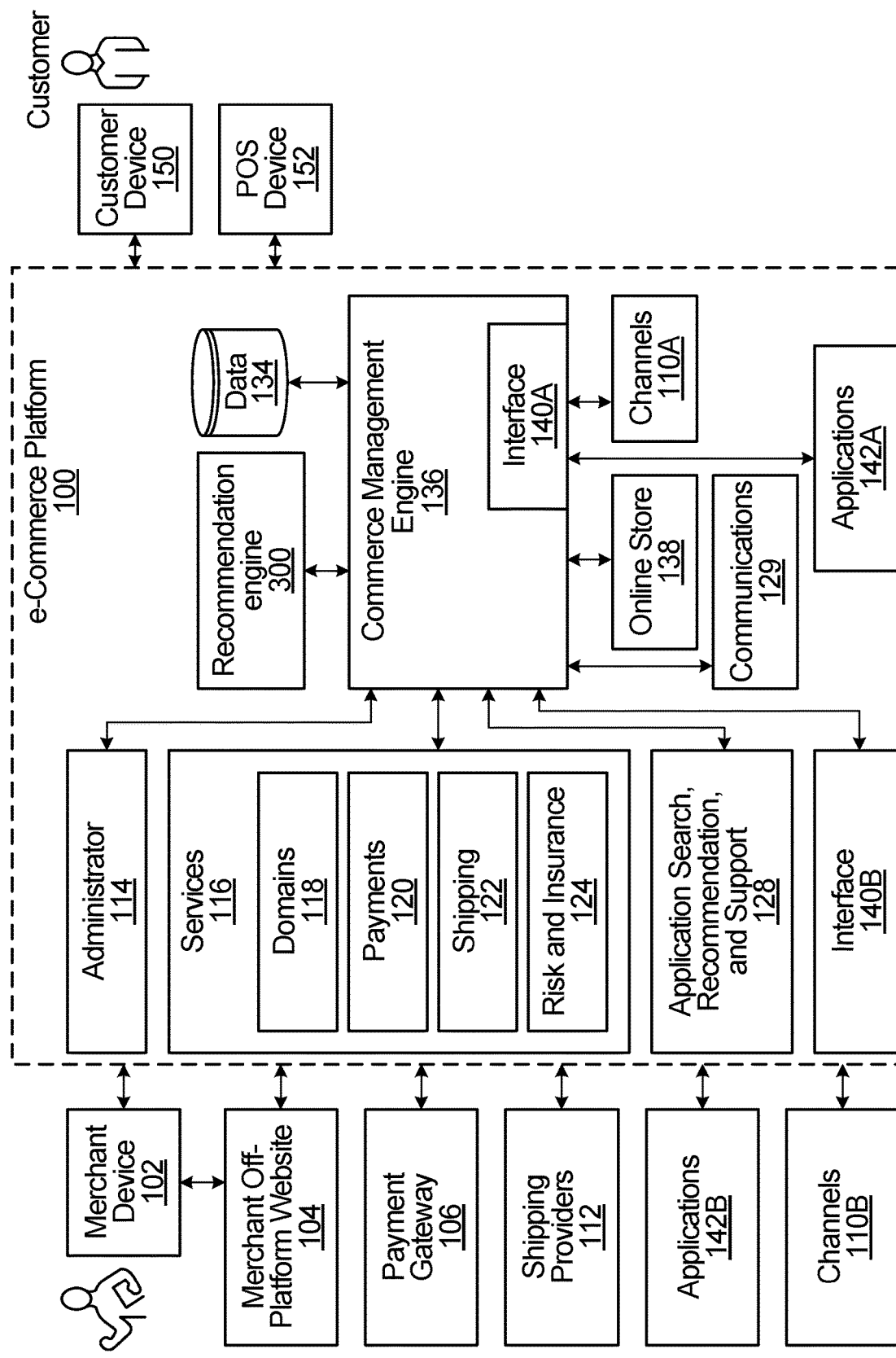
FIG. 3 is a block diagram illustrating a system according to embodiments of the disclosure.

FIG. 3 illustrates the e-commerce platform 100 of FIG. 1, but with the addition of a recommendation engine 300 in communication with the commerce management engine 136. The recommendation engine 300 performs the methods of predicting the probability of products being purchased together as described herein. For example, the recommendation engine 300 may encode product information for a first set of products (e.g. obtained from the data facility 134) to obtain, for each product, a respective numeric vector. The recommendation engine 300 may pair the numeric vectors to obtain a first set of vector pairs, in which each vector pair in the first set of vector pairs corresponds to a respective pair of products from the first set of products. The recommendation engine 300 may input the first set of vector pairs into a machine-learning model (e.g. stored in a memory or other computer-readable medium of the recommendation engine 300) to obtain, for each pair in the first set of vector pairs, probability information indicating whether the respective pair of products corresponding to the respective vector pair are likely to be purchased together. The recommendation engine 300 may be implemented by one or more general-purpose processors that execute instructions stored in a memory or stored in another computer-readable medium. The instructions, when executed, cause the recommendation engine 300 to perform the operations of the recommendation engine 300, e.g., operations relating to predicting the probability of products being purchased together. Alternatively, some or all of the recommendation engine 300 may be implemented using dedicated circuitry, such as an application specific integrated circuit (ASIC), a graphics processing unit (GPU), or a programmed field programmable gate array (FPGA). In some embodiments, the recommendation engine 300 may be located inside the e-commerce platform 100 but external to, and coupled to, the commerce management engine 136 (as illustrated). In some embodiments, the recommendation engine 300 may instead be part of the commerce management engine 136. In some embodiments, the recommendation engine 300 may instead be located externally to the e-commerce platform 100 and possibly coupled to the commerce management engine 136.

Although the recommendation engine 300 in FIG. 3 is illustrated as a distinct component of the e-commerce platform 100 in communication with the commerce management engine 136, this is only an example. The recommendation engine 300 could also or instead be provided by another component residing within or external to the e-commerce platform 100. In some embodiments, either or both of the applications 142A-B may provide a recommendation engine 300 that implements the functionality described herein. The location of the recommendation engine 300 is implementation specific. In some implementations, the recommendation engine 300 is provided at least in part by an e-commerce platform, either as a core function of the e-commerce platform or as an application or service supported by or communicating with the e-commerce platform.

In some embodiments, at least a portion of the recommendation engine 300 could be implemented in a user device (e.g. the merchant device 102). For example, the merchant device 102 could store and run at least some of the recommendation engine 300 locally as a software application.

Although the embodiments described herein may be implemented using the recommendation engine 300 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, but might instead be implemented as a standalone component or service. Therefore, the embodiments below will be described more generally.

Figure 4:
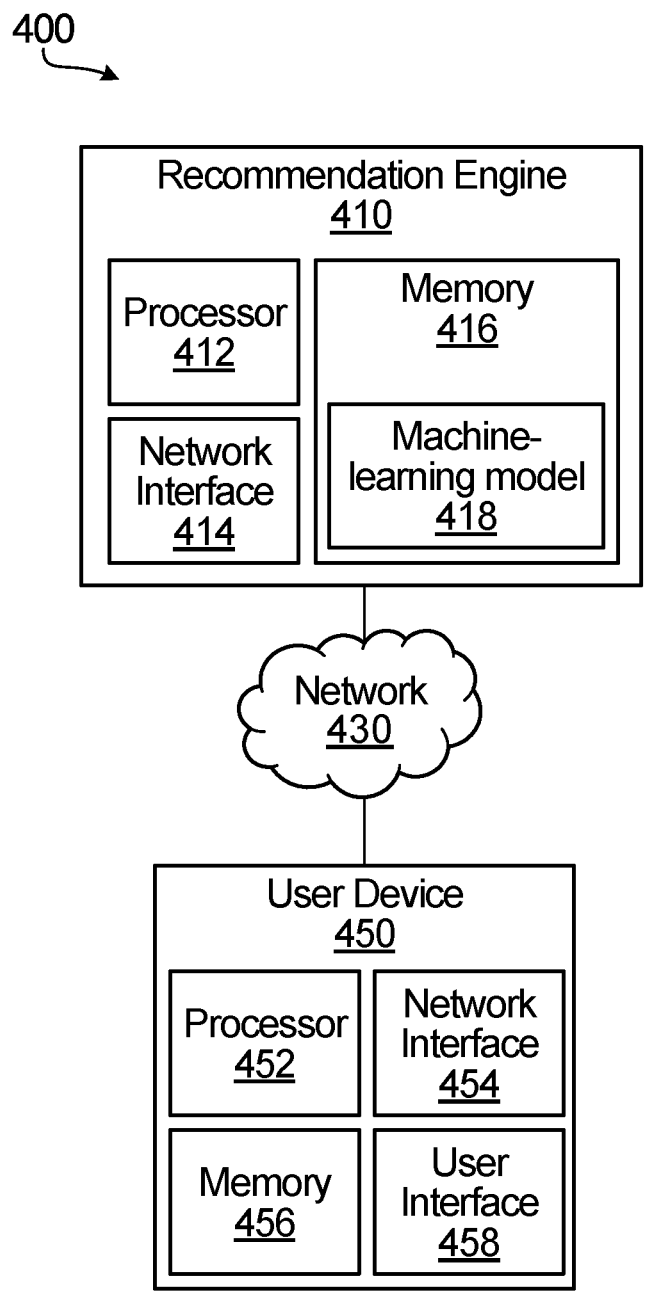
FIG. 4 illustrates a system according to one embodiment.

Example System for Predicting the Probability of Products being Purchased Together FIG. 4 illustrates a system 400 according to one embodiment. The system includes a recommendation engine 410 connected to a user device 450 via a network 430. Only a single user device 450 is illustrated, but it will be appreciated that the recommendation engine 410 may, in general, be connected to one or more user devices 450. Additionally or alternatively, the user device(s) 450 may be selectively and/or periodically connected to the recommendation engine 410 (e.g. where a continuous connection between the recommendation engine 410 and each of the user device(s) 450 is not necessary to carry out a particular step).

The recommendation engine 410 includes a processor 412, network interface 414 and a memory 416. The processor 412 directly performs, or instructs the recommendation engine 410 to perform, the operations described herein of the recommendation engine 410, e.g. operations such as encoding product information, pairing numeric vectors, inputting a set of vector pairs into a machine-learning model etc. The processor 412 may be implemented by one or more general purpose processors, which may be in a distributed computing environment, that execute instructions stored in a memory (e.g. in memory 416) or stored in another computer-readable medium. The instructions, when executed, cause the processor 412 to directly perform, or cause the recommendation engine 410 to perform the operations described herein. In other embodiments, the processor 412 may be implemented using dedicated circuitry, such as a programmed FPGA, a GPU, or an ASIC. In some embodiments, a computer-readable medium may be provided (e.g. separately to the recommendation engine 410). The computer-readable medium may store instructions that, when executed by a computer, cause the computer to perform any of the operations of the recommendation engine 410 described below.

The network interface 414 is for communicating with the user device 450 over the network 430. The network interface 414 may be implemented as a network interface card (NIC), and/or a computer port (e.g., a physical outlet to which a plug or cable connects), and/or a network socket, etc., depending upon the implementation.

The recommendation engine 410 further includes the memory 416. A single memory 416 is illustrated in FIG. 4, but in implementation the memory 416 may be distributed. As illustrated, the memory 416 may be for storing a machine-learning model 418. The machine-learning model 418 is discussed in more detail herein.

In some embodiments, the recommendation engine 410 may be implemented inside of an e-commerce platform (e.g., inside e-commerce platform 100). For example, the recommendation engine 410 may be the recommendation engine 300. In some embodiments, the processor 412, memory 416, and/or network interface 414 may be located outside of the recommendation engine 410.

The user device 450 includes a processor 452, a network interface 454, a memory 456 and a user interface 458. The processor 452 directly performs, or instructs the user device 430 to perform, the operations of the user device 450 described herein e.g. sending an indication that a customer intends to purchase a particular product, outputting a product recommendation at the user interface 458 etc. The processor 452 may be implemented by one or more general purpose processors, which may be in a distributed computing environment, that execute instructions stored in a memory (e.g. the memory 456) or stored in another computer-readable medium. The instructions, when executed, cause the processor 452 to directly perform, or instruct the user device 450 to perform, the operations described herein. In other embodiments, the processor 452 may be implemented using dedicated circuitry, such as a programmed FPGA, a GPU or an ASIC. In some embodiments, a computer-readable medium may be provided (e.g. separately to the user device 450). The computer-readable medium may store instructions that, when executed by a computer, cause the computer to perform any of the operations of the user device 450 described below.

The network interface 454 is for communicating with the recommendation engine 410 over the network 430. The structure of the network interface 454 will depend on how the user device 450 interfaces with the network 430. For example, the network interface 454 may comprise a transmitter/receiver with an antenna to send and receive wireless transmissions to/from the network 430. This may be particularly appropriate in examples in which the user device 450 is a mobile phone, laptop, or tablet. If the user device 450 is connected to the network 430 with a network cable, the network interface 454 may comprise a NIC, and/or a computer port (e.g. a physical outlet to which a plug or cable connects), and/or a network socket, etc. This may be particularly appropriate in examples in which the user device 450 is a personal computer or a cash register (e.g. a till).

The user device 450 also includes the memory 456. A single memory 456 is illustrated in FIG. 4, but in implementation the memory 456 may be distributed. The memory 456 may be for storing a product recommendation received from the recommendation engine 410.

The user interface 458 is for outputting information, such as the product recommendation, to a user. The user interface 458 may additionally be for allowing the user to input information to the user device 450. The user interface 458 may be implemented as a display e.g. a display screen such as a touchscreen, for example. Although the user interface 458 is illustrated as being part of the user device 450, in some embodiments the user interface 458 may be associated with (e.g., connected to) the user device 450.

Figure 5:
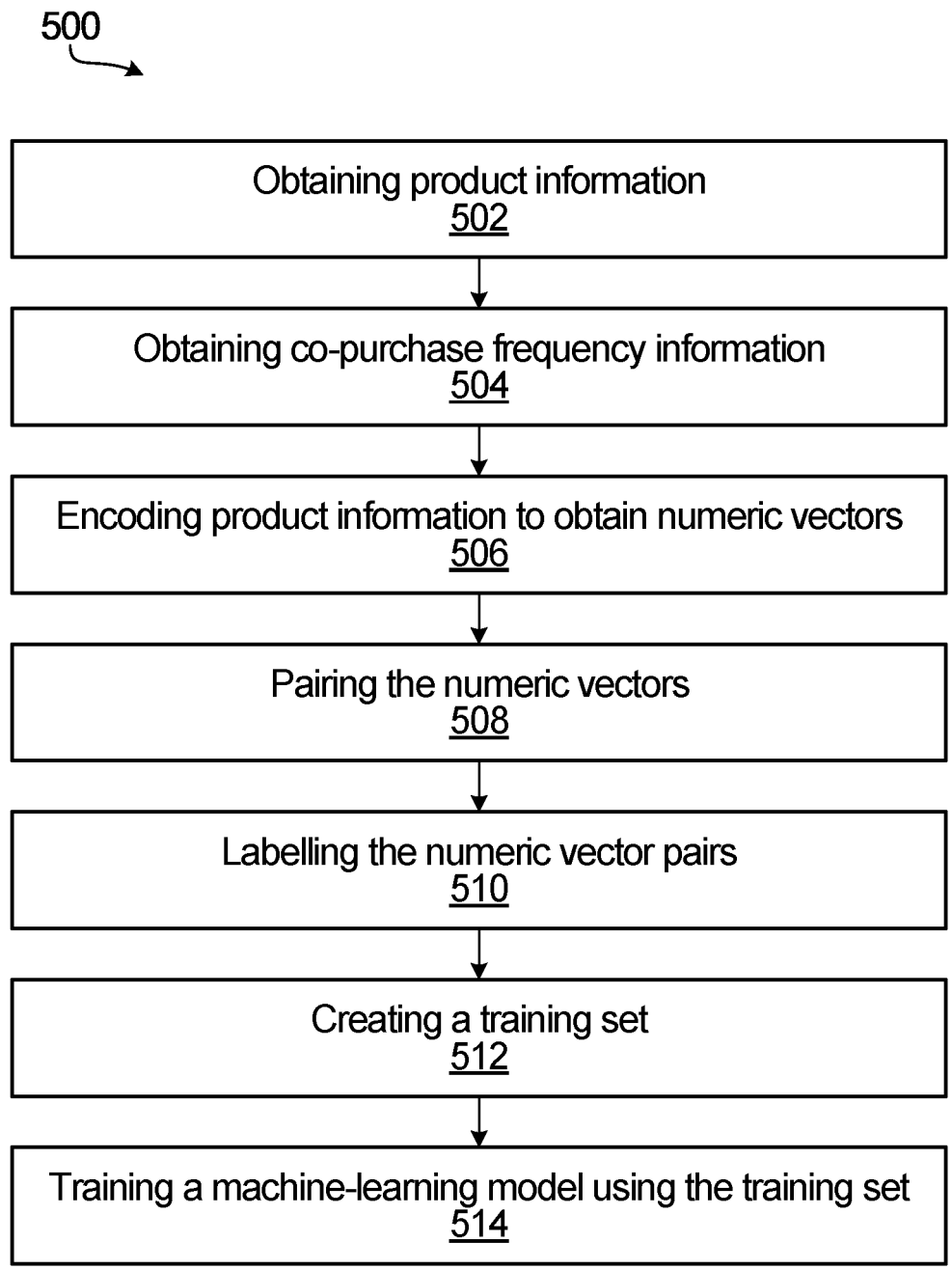
FIG. 5 illustrates a computer-implemented method of training a machine-learning model according to one embodiment.

Training a Machine-Learning Model to Predict the Probability of Products being Purchased Together FIG. 5 illustrates a computer-implemented method 500 of training a machine-learning model according to one embodiment. Not all of the steps in the method 500 are necessary in all embodiments. Also, some of the steps may be substituted by other steps instead.

Figure 6:
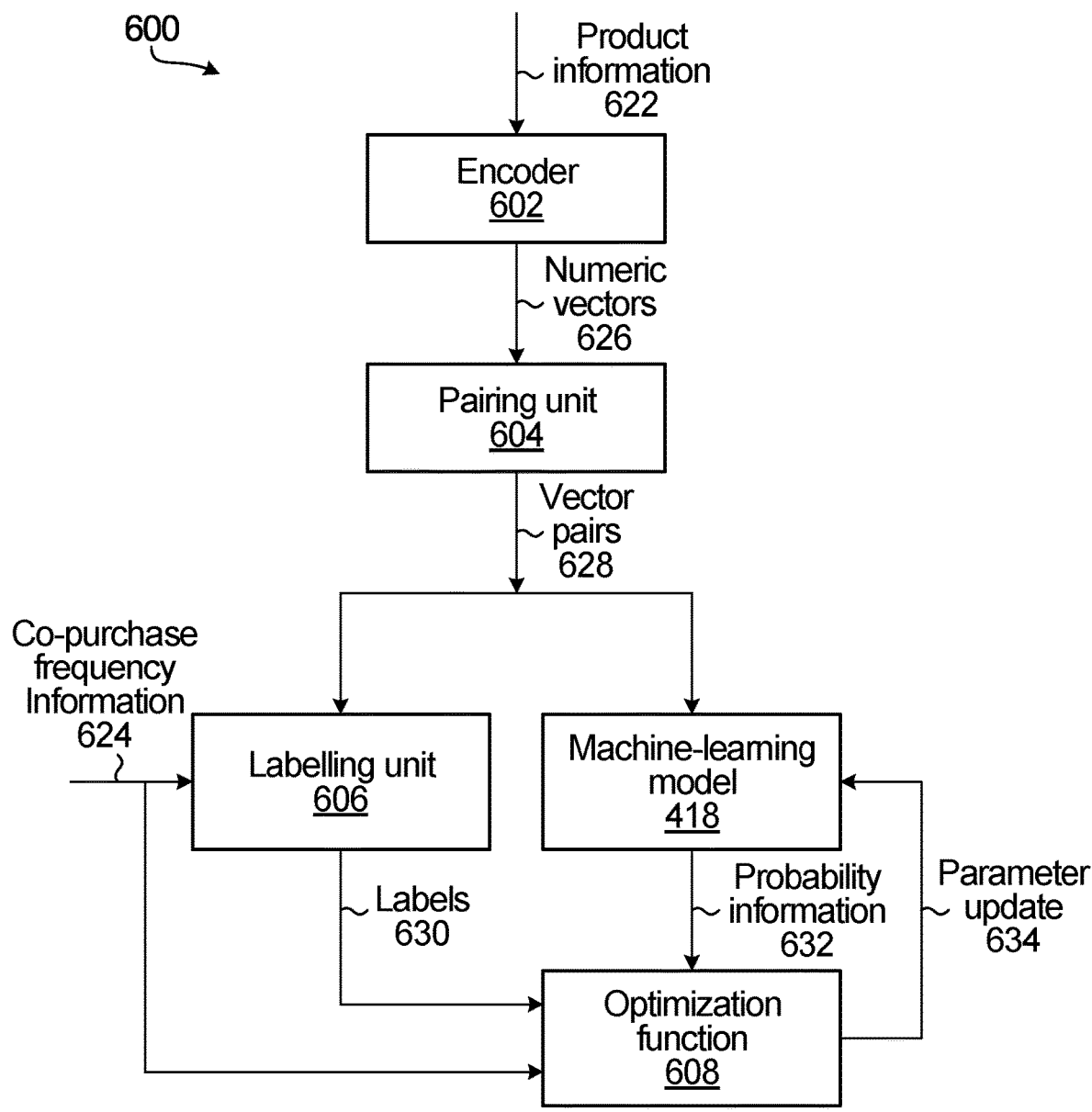
FIG. 6 illustrates a model trainer according to one embodiment.

In the method 500, the steps are described being performed by a model trainer 600 illustrated in FIG. 6. The model trainer 600 is implemented in (e.g. by) the recommendation engine 410, e.g. by the processor 412 of the recommendation engine 410. In alternative embodiments, the model trainer 600 might not be implemented in the recommendation engine 410 (e.g. may be separate to the recommendation engine 410). In some embodiments, the steps of the method 500 may be performed by another entity e.g. another entity in an e-commerce platform.

The model trainer 600 is for training the machine-learning model 418. With reference to FIG. 6, the model trainer 600 comprises an encoder 602, a pairing unit 604, a labelling unit 606, and an optimization function 608. It will be appreciated that the units 602-608 merely illustrate how the functionality of the model trainer 600 may be implemented. It will be appreciated that the model trainer 600 may include more or fewer units than those described here. In some embodiments, one or more of the operations described below in respect of the units 602-608 may be performed by a processor (e.g. the processor(s) 412 of the recommendation engine) executing instructions stored in a memory (e.g. the memory 416) or stored in another computer-readable medium.

The method 500 may begin in step 502 with the model trainer 600 obtaining, for each product in a set of products, respective product information 622.

Each product may comprise a good and/or a service. The products may be or have been available for purchase at one or more stores (e.g. one or more online stores and/or physical stores). The set of products may alternatively be referred to as the set of items.

The product information 622 for a particular product may be information which is descriptive of (e.g. characteristic of) the product. The product information 622 may comprise textual product information such as, for example, one or more of: a product title or name, a product description, a product type or category, an intended use of the product etc. In some embodiments, any text describing the product (e.g. including title and product type or category) may be referred to as "product description". The product information 622 may include, for example, one or more fields extracted from a web page on which the product information 622 is displayed. The product information 622 may, additionally or alternatively, comprise other types of information such as numerical data, image data etc. The product information 622 may comprise an image (e.g. a photograph, an illustration etc.) of the product, for example. Examples of numerical data that may be included in the product information 622 include one or more dimensions of the product (height, width, depth etc.), a weight of the product, an intended age range of the product (e.g. 18 months), a duration of a warranty of a product (e.g. 2 years), a quantity of a component that is included in a product (e.g. the number of chocolates in a chocolate box) etc.

A particular type of product information 622 may be referred to as a field or attribute. Thus, product title, product description and category are examples of different fields. In some embodiments, the product information 622 for different products in the set of products may comprise the same type of product information 622. Thus, for example, the product information 622 for each product may include a product title and a product description. Alternatively, the product information 622 for different products in the set of products may comprise different types of product information 622. For example, the product information 622 for a first product in the set of products may include a product description, whereas the product information 622 for a second product in the second set of products may include a product title and an intended use of the product.

In some embodiments, the product information 622 for different products may have different lengths. For example, the product information 622 for a first product may include a product description that is 100 characters in length, whereas the product information 622 for a second product may include a product description that is 1000 characters in length.

The product information 622 for a particular product may include just one type of product information 622 (e.g. product title). In some embodiments, the product information 622 for a particular product may include many more types of product information 622. For example, the product information 622 may include a long list of product text fields, such as product title, description, category, intended use etc. In some embodiments, the product information 622 may include multiple types or fields of product information 622 concatenated together. The recommendation engine 410 may concatenate multiple fields into a single input (e.g. a single field or vector). For example, the title "Rain Boots", product description "Mid-calf rubber boots with a reinforced sole" and category "Footwear" for a particular product may be concatenated to form a single field "Rain Boots Mid-calf rubber boots with a reinforced sole Footwear" or a single vector ["Rain Boots", "Mid-calf rubber boots with a reinforced sole", "Footwear"].

The model trainer 600 may obtain the product information 622 by retrieving the product information 622 from a memory (e.g. the memory 416 of the recommendation engine 410). Alternatively, the model trainer 600 may obtain the product information 622 by receiving the product information 622 from another entity (e.g. via the network interface 414 of the recommendation engine 410). For example, the model trainer 600 may receive the product information 622 from a commerce management engine such as the commerce management engine 136 or a data facility such as the data facility 134. In some embodiments, the model trainer 600 may receive the product information 622 from more than one entity. For example, product information 622 for products in e.g. different stores, different countries or different currencies may be distributed across multiple entities. The model trainer 600 may aggregate product information 622 received from the multiple entities to obtain the product information 622.

In step 504, the model trainer 600 may obtain co-purchase frequency information 624 for the set of products. The co-purchase frequency information 624 may indicate how many times and/or how often pairs of products in the set of products have been purchased together. For example, the co-purchase frequency information 624 for a first product and a second product may comprise the number of times the first and second product were purchased together (e.g. 5, indicating that the first and second product were purchased together 5 times). The co-purchase frequency information 624 may equal 0 when the first and second product have never been purchased together, for example. The co-purchase frequency information 624 may be relative to the number of times one or both products have been purchased. For example, the co-purchase frequency information 624 for a first product and a second product may comprise the number of times the first and second product were purchased together relative to the number of times the first product was purchased.

In some embodiments, the co-purchase frequency information 624 may comprise the number of times a pair of products were purchased together over a particular time period relative to the length of that time period. This may allow for using co-purchase frequency information 624 for different sources that have been collected over different time periods. For example, a first source may provide the number of times pairs of products have been purchased over a period of 100 days, whilst a second data source may provide the number of times pairs of products have been purchased over a period of 500 days. By including, in the co-purchase frequency information 624, the number of times pairs of products have been purchased relative to the time period over which the purchases occurred, both data sets may be used without biasing the co-purchase frequency information 624 higher for products for which data was collected over a longer period of time.

In some embodiments, the co-purchase frequency information 624 may comprise the time between incidences of the first and second products being purchased together (e.g. a time between co-purchase events). For example, the co-purchase frequency information 624 may comprise average time period between a particular pair of products being purchased together once and the particular pair of products being purchased together again (e.g. 5 hours). In examples in which the co-purchase frequency information 624 is based on the time between co-purchase events, the co-purchase frequency information 624 for a particular pair of products may be set to a default value when that pair of products have never been purchased together.

In some examples, the co-purchase frequency information 624 may only include information for products that have been purchased together. Thus, the omission of a particular pair of products from the co-purchase frequency information 624 may be understood to imply that the particular pair of products have not been purchased together.

The co-purchase frequency information 624 may be specific to a particular time period. That is, the co-purchase frequency information 624 may indicate how many times and/or how often pairs of products in the set of products have been purchased together in that particular time period. For example, the co-purchase frequency information 624 may indicate that a first product and a second product have been purchased together 5 times in the last 100 days.

It will be appreciated that there are many ways to define whether or not a pair of products have been purchased together. Two products may be considered to have been purchased together when one or more of the following criteria are satisfied (e.g. are met): the pair of products were purchased in a single transaction, the pair of products paid for in a single payment, the pair of products were purchased in a single visit to a particular store (e.g. an online store or a physical store), the pair of products were purchased in a single session (e.g. both purchases are associated with a same session identifier), the pair of products were purchased within a particular time interval of one another (e.g. one product was purchased within 10 minutes of the other product being purchased), the pair of products were purchased by the same user (e.g. using the same account), the pair of products were purchased by the same device, the pair of products were purchased from the same store, the pair of products were purchased by the same household, the pair of products were purchased from different stores operated by the same organisation (e.g. from different branches of a particular retailer, or one product was purchased from the retailer's online store and the other product was purchased from a physical store of the retailer) etc.

The model trainer 600 may obtain the co-purchase frequency information 624 by retrieving the co-purchase frequency information 624 from a memory (e.g. the memory 416 of the recommendation engine 410). Alternatively, the model trainer 600 may obtain the co-purchase frequency information 624 by receiving the co-purchase frequency information 624 from another entity (e.g. via the network interface 414 of the recommendation engine 410). For example, the model trainer 600 may receive the co-purchase frequency information 624 from a commerce management engine such as the commerce management engine 136 or a data facility such as the data facility 134. In some embodiments, the model trainer 600 may receive the co-purchase frequency information 624 from more than one entity. For example, co-purchase frequency information 624 for products in e.g. different stores, different countries or different currencies may be distributed across multiple entities. The model trainer 600 may aggregate co-purchase frequency information 624 received from the multiple entities to obtain the co-purchase frequency information 624.

In some embodiments, the model trainer 600 may obtain the product information 622 and the co-purchase frequency information 624 together. The model trainer 600 may, for example, obtain the product information 622 and the co-purchase frequency information 624 in a single dataset. The model trainer 600 may receive the product information 622 and the co-purchase frequency information 624 from the same entity or entities (e.g. in the same message or in a same particular signalling exchange).

In some embodiments, the model trainer 600 may obtain the co-purchase frequency information 624 by determining the co-purchase frequency information 624. The model trainer 600 may determine the co-purchase frequency information 624 based on a sales history of the set of products. The sales history may include, for each transaction in one or more transactions, a list of one or more products that were purchased in that transaction. The sales history may also include other details of the transaction such as, for example, a time, location of the store (e.g. if the transaction occurred in a physical store), an indication of the customer or customer device involved in the transaction (e.g. an identifier of the customer, an identifier of an account of the customer, an Internet Protocol address of the customer device etc.), an identifier for the store, an identifier for the retailer, a session identifier (e.g. for online transactions) etc. It will be appreciated that there may be various ways that the model trainer 600 may determine the co-purchase frequency information 624 based on the sales history for the set of products. For example, the model trainer 600 may identify, in the sales history, products that were purchased in transactions with a same session identifier as being purchased together and count the number of incidences of these co-purchases in the sales history. As another example, the model trainer 600 may count the number of transactions that include a particular pair of products in order to determine the co-purchase information for that pair of products.

In step 506, the encoder 602 encodes, for each product in the set of products, the product information 622 to obtain a respective numeric vector 626 for that product. The encoding may map product information 622 of different formats (e.g. different sizes and/or lengths) to numeric vectors of the same format. The numeric vectors 626 may have the same size. For example, the encoding may map product information 622 (e.g. of any length) to a numeric vector 626 of a fixed size. By encoding the product information 622 to obtain numeric vectors 626, the product information 622 may be transformed into a format that is intelligible to the machine-learning model 418. A numeric vector may be, for example, a sequence, set, or tuple of numbers. Numeric vectors of the same size may refer to the same number of elements, e.g. no matter what the character length (e.g. number of letters or words) of the product information text, the resulting numeric vector is always n elements, where each element is a number.

In some embodiments, the encoding is based on a form of embedding, feature extraction (e.g. from an image in the product information), and/or some other scheme for vectorization. In some embodiments, encoding the product information 622 for a product may involve encoding textual product information to obtain a numeric vector 626 for that product. The encoding may be based on one or more words in the textual product information for that product. The encoding may be based on character, word, and/or sentence embedding, for example. The encoding may be based on individual words within the textual product information (e.g. disregarding the context of each word, such as grammar, word order, relational semantics etc.). For example, the encoder 602 may model textual product information using bag-of-words to obtain numeric vectors 626 indicating the frequency of words in the textual product information. In another example, encoding the textual product information may involve determining the term frequency-inverse document frequencies (TF-IDFs) of words in the textual product information. The numeric vectors 626 may be on based on the TF-IDFs of one or more words in the textual product information, for example. In another example, the textual product information may be encoded using (e.g. by inputting the textual product information into) another machine-learning model that uses transfer learning via sentence embeddings. The machine-learning model may output the numeric vectors 626. Encoding the textual product information based on one or more words (e.g. disregarding the context of each word) may be particularly advantageous for particular types of product information, such as product title, material, colour etc.

In some embodiments, the numeric vector 626 obtained by encoding textual product information for a particular product may be based on a meaning of a sequence of words in the textual product information for that product. For example, the encoding may be based on the context of individual words in the sequence of words such as the word order, the grammar of the word sequence, relational semantics within the word sequence etc. The encoding may be based on a phrase, sentence and/or paragraph-level (e.g. considering the semantics of a phrase, a sentence and/or a paragraph in the textual product information), for example. In some embodiments, encoding the product information 622 may involve using sentence embeddings. That is, encoding the textual product information for a product may involve representing entire sentences (e.g. including their semantic information) in the product information as the numeric vector 626. This may be particularly advantageous as it allows the numeric vectors 626 to capture (e.g. represent or indicate) the meaning of the product information as a whole, such that the distance between the numeric vectors 626 for two products may indicate a difference in the meaning of the product information for those two products. Encoding the textual product information using sentence embeddings may also be particularly advantageous for particular types of product information, such as product information that includes at least one paragraph (e.g. a product description).

In some embodiments, encoding the textual product information for a particular product using sentence embeddings may involve encoding the textual product information using (e.g. by inputting the textual product information into) another machine-learning model that uses transfer learning via sentence embeddings. The other machine-learning model may output, based on the textual product information, the numeric vectors 626. One example of such a machine-learning model is the Universal Sentence Encoder. Further information regarding the Universal Sentence Encoder may be found in "Universal Sentence Encoder", Cer et al., arXiv: 1803.11175 published 12 Apr. 2018 and available at https://arxiv.org/abs/1803.11175, which is incorporated herein by reference in its entirety. The Universal Sentence Encoder may be particularly advantageous because it captures the meaning of entire sentences and supports multiple languages.

In some embodiments, the model trainer 600 may store a mapping (not illustrated) of the numeric vectors to identifiers for the products. The mapping may indicate which numeric vector corresponds to which product. The mapping may, for example, associate each numeric vector with a respective product identifier. The product identifier may be a product title, a stock keeping unit (SKU) number etc. The mapping may be stored in a memory, such as the memory 416 of the recommendation engine 410. The mapping may be in any suitable form. For example, the mapping may include a table that includes identifiers for each of the products and the numeric vectors for the products.

In step 508, the pairing unit 604 pairs the numeric vectors 626 for the set of products to obtain a set of vector pairs 628. Each vector pair in the set of vector pairs 628 may correspond to a respective pair of products in the set of products.

In some embodiments, pairing the numeric vectors 626 may involve generating pairs of every possible combination of the numeric vectors 626. That is, the numeric vector 626 for each product in the set of products may be paired with the numeric vector 626 of each other product in the set of products.

In some examples, the pairing unit 604 may pair the numeric vectors 626 based on the co-purchase frequency information 624 (not illustrated). For example, the recommendation 510 may pair the numeric vectors 626 such that, according to the co-purchase information, the set of vector pairs 628 includes a similar (e.g. the same or the same order of magnitude) numbers of vector pairs corresponding to products that have been purchased together and vector pairs corresponding to products that have not been purchased together. Including a similar number of vector pairs for products that have been purchased together and a similar number of vector pairs for products that have not been purchased together in the training set for the machine-learning model may reduce the time taken for the model to converge during training.

In some embodiments, the pairing unit 604 may pair the numeric vectors 626 for the products based on the product information 622. The pairing unit 604 may only pair products that are in the same category, for example. For example, the pairing unit 604 may pair "Woollen Socks" and "Gladiator Sandals" together because they are both apparel and might not pair "Butter" and "Woollen Socks" together because "Butter" is not apparel. In some embodiments, the pairing unit 604 may pair the numeric vectors 626 for the products based on store and/or retailer. For example, products in a same store (e.g. an online store or a physical store) may be paired together. In another example, products from a same retailer (e.g. in the same store or different stores of the retailer) may be paired together. In some embodiments, the pairing unit 604 may pair numeric vectors 626 based on customer browsing history. The customer browsing history may indicate which products a customer has viewed (e.g. in online store accessed via a web browser or another application). The customer browsing history may include session information indicating which products were viewed in a session. The customer browsing history may include time information indicating which products were viewed in a time window. The numeric vectors 626 may be paired such that products that have been viewed together (e.g. in a same session as indicated by the session information and/or within a time window as indicated by the time information) are paired together. Vector pairs 628 for products that have been viewed together may be paired together whether or not the corresponding products were purchased together.

In some embodiments, the numeric vectors 626 may be paired based on a combination of the factors described above. For example, the numeric vectors 626 may be paired based on both the customer browsing history and the co-purchase information. The vector pairs 626 for products that have been viewed together may be paired together in such a way that the resulting set of vector pairs includes a similar number of vector pairs for products that have been purchased together and a similar number of vector pairs for products that have not been purchased together, for example.

Pairing two numeric vectors 626 to form a vector pair 628 may involve concatenating one of the two numeric vectors 626 to the other of the two numeric vectors 626. For example, one of the two numeric vectors 626 may be appended to the end of the other of the two numeric vectors 626. The vector pair 628 for two numeric vectors 626 may thus comprise a vector that is twice the size of those two numeric vectors 626, e.g. if each numeric vector consists of n elements (numbers), the vector pair 628 may be a set of 2n elements consisting of the n elements of the first numeric vector concatenated with the n elements of the second numeric vector. The two numeric vectors, concatenated, may form a new vector, e.g. of 2n elements. Concatenating two numeric vectors 626 to form the vector pair 628 may simplify the implementation of the machine-learning model 418 because machine-learning models are typically designed to process vector or matrix-based inputs. In some embodiments, pairing two numeric vectors 626 to form a vector pair 628 may involve indicating that the two numeric vectors 626 form a pair in other ways. For example, two numeric vectors 626 may be paired by associating the two numeric vectors 626 with a same identifier (e.g. a pair identifier).

In step 510, the labelling unit 606 labels the vector pairs 628 to obtain, for each vector pair 628 in the set of vector pairs 628, a label 630 indicative of whether or not the respective pair of products associated with the vector pair 628 have been purchased together. The labels may be referred to as tags. Labelling the vector pairs 628 may be described as tagging the vector pairs 628. The labels 630 may be binary e.g. such that each label takes one of two values. For example, a label for a vector pair may be equal to 0 when the corresponding products have not been purchased together or equal to 1 when the corresponding products have been purchased together. In another example, a label for a vector pair may be equal to FALSE when the corresponding products have not been purchased together or equal to TRUE when the corresponding products have been purchased together. Using binary labels may simplify the operation of the optimization function 608 and, in particular, may simplify the input of the labels into a loss function used by the optimization function as described in more detail below.

The labelling unit 606 may thus provide a set of labels 630 for the set of vector pairs 628 which indicate whether or not each vector pair in the set of vector pairs 628 has been purchased together. In some embodiments, the labelling unit 606 may label the vector pairs based on the co-purchase frequency information 624 and the mapping of the numeric vectors to the identifier for the products. Thus, for example, the labelling unit 606 may determine, for each vector pair in the set of vector pairs 628, which products the vectors in that vector pair 628 correspond to based on the mapping and, based on the co-purchase frequency information 624, determine whether or not those products were purchased together.

In step 512, the model trainer 600 may create a training set (not illustrated) using the set of labels 630 and the set of vector pairs 628. The training set may include all of the vector pairs in the set of vector pairs 628 and all of the labels in the set of labels 630. In some embodiments, the training set may include only a subset of the set of vector pairs 628 and the corresponding subset of the set of labels 630. That is, the model trainer 600 may omit, from the training set, at least some of the vector pairs 628. The model trainer 600 may omit at least some of the vector pairs 628 that are associated with a label indicating that the respective pair of products have not been purchased together, for example. Typically, most products will not have been purchased together, which means that the set of vector pairs 628 may often include many more vector pairs for products that have not been purchased together than vector pairs for products that have been purchased together. Including a similar number of vector pairs that have been purchased together and vector pairs that have not been purchased together in the training set can cause the training of the machine-learning model 418 to converge more quickly.

The model trainer 600 may determine which vector pairs to omit from the training set by selecting some of the vector pairs that are associated with labels indicating that the respective pairs of products have not been purchased together at random. In some embodiments, the labels may indicate that the pairs of products have not been purchased together in a first time period. The model trainer 600 may determine whether the pairs of products have been purchased together over a second, longer time period (e.g. according to the sales history described above) and omit at least some of vector pairs from the training set that have not been purchased together over the second, longer time period. For example, the labels indicating that respective pairs of products have not been purchased together may indicate that the respective pairs of products have not been purchased over the last 100 days. However, some of those products may have been purchased together longer ago in the past e.g. at some point between 100 and 1000 days ago, whilst other products might not have been purchased together in the last 1000 days at all. The model trainer 600 may omit vector pairs for the products that have not been purchased together over the longer time period of 1000 days from the training set. As a result, the training set might include only vector pairs for products that have been purchased together at some point in the last 1000 days and the labels may indicate whether or not pairs of products were purchased together in the last 100 days. More generally, the labels may indicate whether or not a pair of products have been purchased together over a first time period and the model trainer 600 may omit one or more vector pairs from the training set based on whether or not the corresponding pair of products have been purchased together over a second, longer, time period. In some embodiments, the model trainer 600 may determine whether the pairs of products have ever been purchased together (e.g. according to the data available to the model trainer 600) and omit at least some vector pairs from the training set that have never been purchased together.

In step 514, the model trainer 600 trains the machine-learning model 418 using the training set. The machine-learning model 418 may be trained in one or more training iterations. One or more parameters of the machine-learning model 418 may initially (e.g. before training) be set to respective initial values. In each training iteration, the optimization function 608 may update the values of the one or more parameters of the model and the updated model (e.g. the machine-learning model 418 using the updated parameters) may be used for the next training iteration.

In each training iteration, the vector pairs in the training set may be input to the machine-learning model 418 to obtain, for each vector pair in the training set, probability information indicating whether the pair of products corresponding to that vector pair are likely to be purchased together. The probability information may be expressed as a number ranging from 0 to 1 (e.g. with 0 indicating that there is no likelihood of the products being purchased together and 1 indicating the maximum likelihood of the products being purchased together), as a percentage (e.g. with 0% indicating that there is no likelihood of the products being purchased together and 100% indicating the maximum likelihood of the products being purchased together) etc.

In that training iteration, the optimization function 608 may update (e.g. adjust, modify, change, perturb etc.) one or more parameters of the machine-learning model 418 based on the probability information for the vector pairs in the training set and the labels for the vector pairs in the training set (e.g. based on a comparison of the probability information 632 and the labels). The optimization function 608 may, for example, update the parameters based on a loss function determined based on the labels and the probability information.

The loss function may be based on a difference between the labels and the probability information. For example, if a vector pair corresponds to a pair of products purchased together, the label may be '1'. In a particular training iteration, the machine-learning model 418 may indicate, for example, a probability of 0.6 that the pair of products are purchased together. The loss may be computed as (or based on) 1−0.6=0.4. Based on this loss value, at least one parameter of the machine-learning model 418 is updated to try to reduce the loss value (e.g. bring it closer to zero) in future training iterations. In some embodiments, the loss function may additionally be based on the co-purchase frequency information 624 for the vector pairs in the training set. For example, the loss function may include, for each vector pair in the training set, a coefficient that is based on how frequently products corresponding to that vector pair were purchased together (e.g. as indicated by the co-purchase frequency information 624). The coefficient associated with a vector pair that corresponds to products that have been frequently purchased together may amplify the loss function during training more than another coefficient associated with a different vector pair corresponding to products that have not been frequently purchased together (e.g. were rarely purchased together). This allows for frequency of co-purchase to be incorporated into the training of the machine-learning model such that the model will assign a higher probability of products being purchased together for products that have been more frequently (e.g. more often) purchased together. As a simple example, a loss value that might normally be 0.4 may be amplified to 0.8 by the coefficient if the two products were very frequently co-purchased together, which may cause a parameter of the machine-learning model 418 to be updated in a way that more strongly favours assigning a high probability of co-purchase to the same or similar product pairs.

The optimization function 608 may, for example, seek to optimize (e.g. minimize) the loss function. The optimization function 608 may seek to minimize the loss function using any suitable optimization (e.g. minimization) process (e.g. algorithm) such as gradient-descent, Limited Memory Broyden-Fletcher-Goldfarb-Shanno algorithm (L-BFGS), Levenberg-Marquardt (LM) etc.

The parameters of the machine-learning model 418 that are updated by the optimization function 608 may depend on the type of machine-learning model. The machine-learning model may comprise a classifier (e.g. a classifier implemented using machine-learning). In some embodiments, the machine-learning model 418 may comprise a neural network. The parameters updated by the optimization function 608 may include, for example, one or more weights and/or one or more biases of the neural network, for example. In general, the machine-learning model 418 may be any suitable machine-learning model such as, for example, a decision tree, a support vector machine, a neural network etc.

After the values of the one or more parameters of the machine-learning model 418 are updated, the next training iteration may be performed e.g. another set of vector pairs may be input to the (adjusted) machine-learning model 418. Each training iteration may thus use a new training set. Thus, one or more of (e.g. all of) steps 502-512 may be repeated to create a respective training set for each training iteration. In some embodiments, only step 512 may be repeated for each training set. For example, the set of vector pairs 628 and their corresponding labels 630 may be divided into subsets to form a plurality of training sets, in which each training set in the plurality of training sets is for use in a respective training iteration. In some embodiments, a training set may be established by performing steps 502-512, and then each training iteration may use a respective different subset of vector pairs of the training set. Some of the vector pairs of the training set might even be reserved for testing.

Training the machine-learning model 418 may continue until a particular number of training iterations have been reached. In some embodiments, the model trainer 600 may determine to stop training the machine-learning model 418 (e.g. may determine to not perform another training iteration) when training of the machine-learning model 418 has converged. Any suitable approach for assessing whether training of the machine-learning model 418 has converged may be used. For example, the model trainer 600 may determine to stop training the machine-learning model 418 when the difference between parameter values between different training iterations (e.g. a size of the updates) is below a threshold value.

Figure 7:
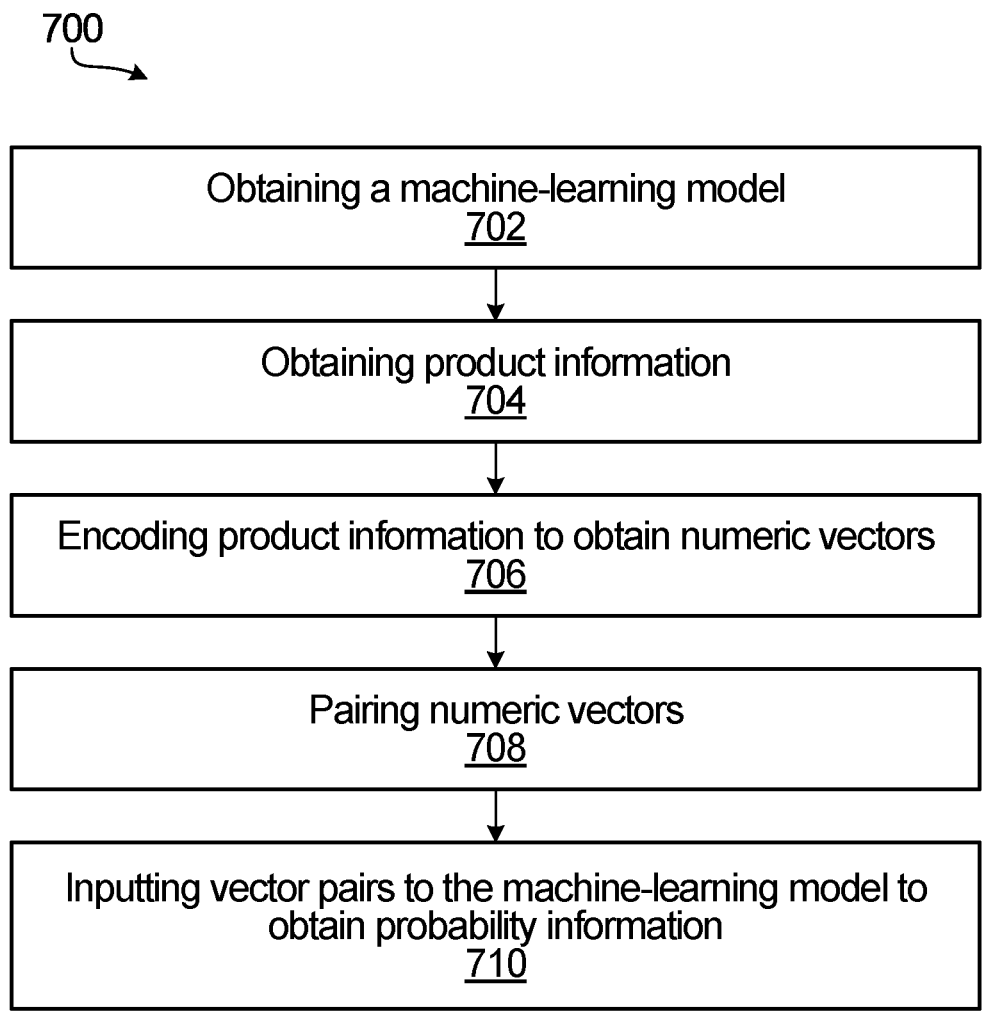
FIG. 7 illustrates a computer-implemented method of using the machine-learning model according to one embodiment.

Using a Machine-Learning Model to Predict the Probability of Products being Purchased Together FIG. 7 illustrates a computer-implemented method 700 of using the machine-learning model 418 according to one embodiment. Not all of the steps in the method 700 are necessary in all embodiments. Also, some of the steps may be substituted by other steps instead.

In the method 700, the machine-learning model 418 has been trained according to the method 500 described above. In some embodiments, the machine-learning model might not be the machine-learning model 418. The machine-learning model 418 may have been trained using methods other than the method 500, for example.

The steps of the method 700 are performed by the recommendation engine 410. In some embodiments, the steps of the method 700 may be performed by another entity e.g. another entity in an e-commerce platform.

In step 702, the recommendation engine 410 obtains the machine-learning model 418. The recommendation engine 410 may obtain the machine-learning model 418 by training the machine-learning model 418. For example, the recommendation engine 410 (e.g. or a model trainer, such as the model trainer 600, in the recommendation engine 410) may, in step 702, perform the method 500. In some embodiments, training of the machine-learning model 418 may be performed elsewhere. The recommendation engine 410 may, for example, receive the trained machine-learning model 418 from another entity e.g. another entity in an e-commerce platform such as the e-commerce platform 100. The machine-learning model 418 may be received over the network 430 via the network interface 414, for example. In some embodiments, the recommendation engine 410 may obtain the machine-learning model 418 by retrieving the machine-learning model 418 from a memory (e.g. the memory 418). The recommendation engine 410 may receive or train the machine-learning model 418 at a first time and retrieve the machine-learning model 418 from the memory at second, later time. In some embodiments, the recommendation engine 410 may retrieve the machine-learning model 418 from the memory in response to receiving a request (e.g. a request for probability information and/or product information). In some embodiments, the recommendation engine 410 may retrieve the machine-learning model 418 from the memory in response to receiving product information (e.g. as described in more detail below in respect of step 704).

In step 704, the recommendation engine 410 obtains, for each product in a set of products, respective product information. The set of products may be defined in the same way as the set of products described above in respect of the method 500. However, one difference is that the set of products obtained for the method of FIG. 7 may include one or more products not having useable sales history, e.g. there are one or more products for which it is desired to determine the probability of co-purchase, but there is no sales history providing such information, e.g. they may be new products and/or products for a new online store that has just launched. The product information may be defined in the same way as the set of products described above in respect of the method 500. However, the product information that is used in the method 700 (e.g. to be processed by the trained machine-learning model 418) may be different from the product information that is used in the method 500 (e.g. to train the machine-learning model 418). In some embodiments, the product information that is obtained in step 704 may be for a first set of products and the machine-learning model may be trained (e.g. according to the method 500) using product information for a second set of products. The first and second set of products may be mutually exclusive (e.g. each product in the second set of products might not be present in the first set of products and vice-versa). In some embodiments, the first and second set of products may overlap. For example, the first set of products (e.g. for which product information is obtained in step 704) may include at least one product that is not in the second set of products. This allows e.g. a retailer to use the sales history for their existing products to suggest which products may be purchased together with a new product, thereby allowing insightful product recommendations for a new product to be generated.

In some embodiments, the product information obtained in step 704 and the product information used to train the machine-learning model 418 may be used for different stores and/or retailers. For example, the product information used to train the machine-learning model 418 may be for products from a first store (e.g. a store for which a sales history is available), and the product information processed by the trained machine-learning model 418 in FIG. 7 may be for products from a different second store (e.g. a new store or a store for which no sales history is available). Thus, for example, the product information used to train the machine-learning model 418 may be for products from a first online store, and the product information processed by the trained machine-learning model 418 in FIG. 7 may be for products from a second online store. This may allow e.g. a retailer to use the sales history for one store to suggest which products in a new store may be purchased together, which allows for generating insightful product recommendations for a new store. It may also allow the sales history of a first retailer to be leveraged to provide product recommendations for a second retailer without disclosing the sales history of the first retailer to the second retailer.

In step 706, the recommendation engine 410 encodes, for each product in the set of products, the product information to obtain a respective numeric vector for that product. Step 706 may be performed in accordance with step 506 described above, except performed in respect of the product information obtained in step 704 rather than the product information obtained in step 502.

The method 700 may also involve the recommendation engine 410 storing a mapping (not illustrated) of the numeric vectors to identifiers for the products (e.g. as described above in respect of the method 500). The mapping may be stored in a memory such as the memory 416, for example.

In step 708, the recommendation engine 410 pairs the numeric vectors for the set of products to obtain a set of vector pairs. Each vector pair in the set of vector pairs may correspond to a respective pair of products in the set of products. Step 708 may be performed in accordance with step 508 described above, except performed in respect of the numeric vectors obtained in step 706 rather than the numeric vectors obtained in step 506.

In step 710, the recommendation engine 410 inputs the set of vector pairs into the machine-learning model 418 to obtain, for each pair in the set of vector pairs, probability information indicating whether the respective pair of products corresponding to the respective vector pair are likely to be purchased together. The probability information may be defined as described above in respect of the method 500.

FIG. 8 shows an example of probability information that may be obtained in step 710. In particular, FIG. 8 shows a table 800 in which each row in the first column includes the numeric vector for a particular product in a set of products (where the set of products includes an umbrella, rainboots, a raincoat and a sweater), and each row in the second column includes the numeric vector for another product in the set of products. The third column includes, for the pair of products corresponding to the vector pairs identified in the first and second columns, a probability that the products in that pair will be purchased together. Thus, according to FIG. 8, there is a 10% probability that the umbrella and the rainboots will be purchased together. It will be appreciated that, although FIG. 8 does not show a probability for each possible combination of products (e.g. the combination of a sweater and raincoat is missing), in some embodiments, the probability information obtained in step 710 may include a probability for each possible combination of products.

In some embodiments, the method 700 may also involve associating the probability information obtained in step 710 with respective pairs of products in order to determine the probability of two products being purchased together. The probability information provided by the machine-learning model may be associated with the set of vector pairs that were input to the model. That is, the machine-learning model may provide probability information for the set of vector pairs and it might not be immediately apparent how that probability information is associated with particular pairs of products. The recommendation engine 410 may use a mapping between the numeric vectors and identifiers for the products (e.g. the mapping described above) to associate the probability information with respective pairs of products (e.g. with identifiers for the respective pairs of products). The recommendation engine 410 may retrieve the mapping from memory (e.g. the memory 416), for example. FIG. 9 shows an example of a table 900 in which the probability information from FIG. 8 is associated with product identifiers for the products corresponding to the vector pairs shown in FIG. 8.

By performing the method of FIG. 7, product information (e.g. text describing a product), may be used as the basis for determining a probability for co-purchase, which allows probability of co-purchase to be determined for products that have little or no sales history. The machine-learning model is trained on previous products having co-purchase sales history, but during training the parameters of the machine-learning model are updated based on the product information for those previous products (e.g. based on the product descriptions for the websites of those products). Then, after training, only the product information for the new products is needed for processing by the trained machine-learning model. For example, a merchant opening a new online store with new products may input a product description for each of those products into FIG. 7 (step 704), and obtain a value representing the likelihood that particular pairs of those products will be purchased together, possibly before anyone has even purchased those products. The encoding of the product information into a numeric vector (step 706) allows for the product information to be input into the trained machine-learning model. In embodiments in which the numeric vectors are the same size (e.g. n-elements), product information of any character length (e.g. any number of words) may be mapped to a same suitable numeric vector for input into the trained machine-learning model, which means, for example, that product descriptions of different lengths for different products may be accommodated.

Using the Probability of Products being Purchased Together

Figure 10:
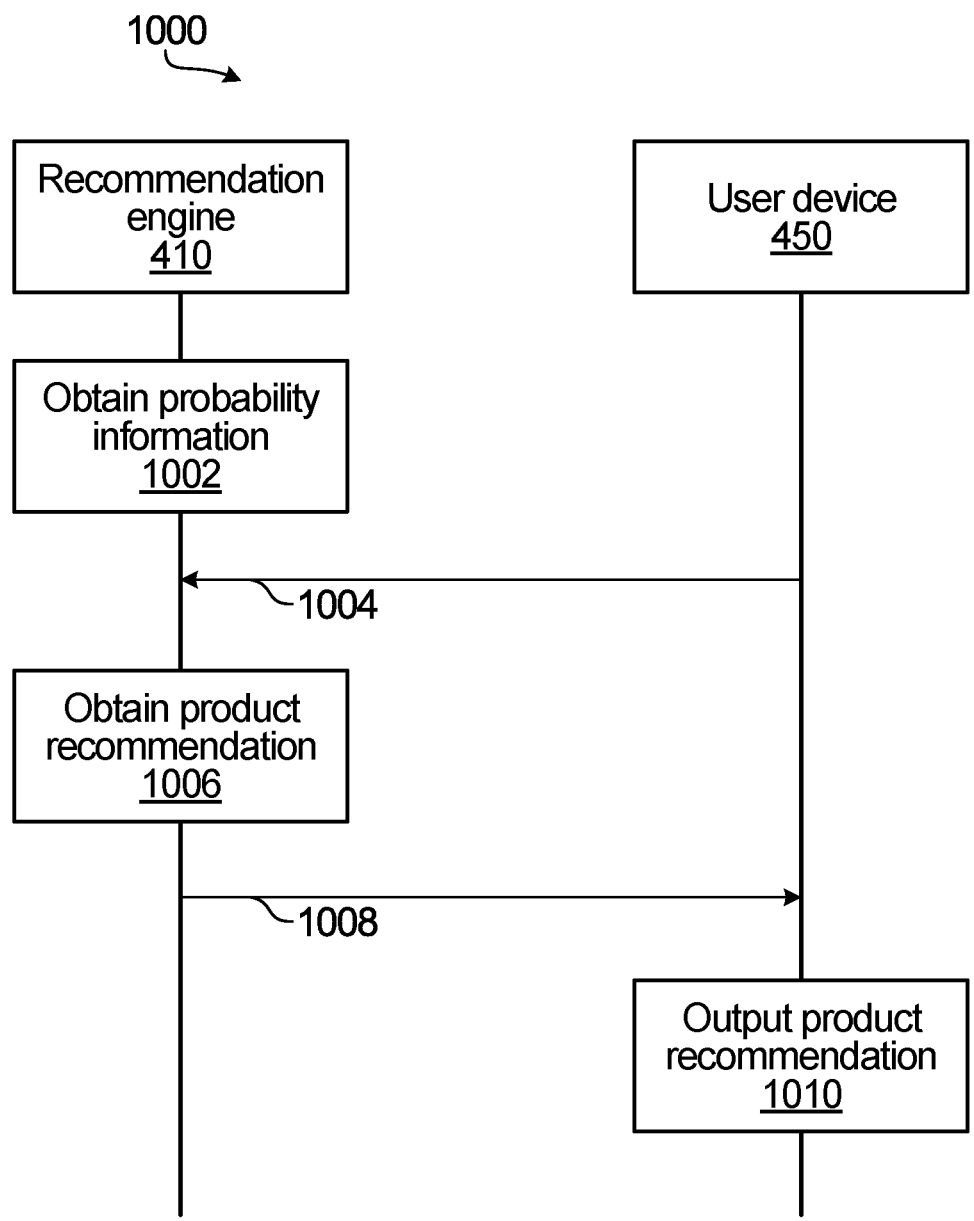
FIG. 10 illustrates a computer-implemented method according to one embodiment.

FIG. 10 illustrates a computer-implemented method 1000 according to one embodiment. The method 1000 is described as being performed by the recommendation engine 410 and the user device 450. In other embodiments, the method 1000 may be performed by one or more other entities. For example, steps 1002, 1006 and 1010 described below may be performed by a single entity, such as a merchant device, and steps 1004 and 1008 may be omitted. The method 1000 is computer-implemented. Not all of the steps in the method 1000 are necessary in all embodiments. Also, some of the steps may be substituted by other steps instead.

In step 1002, the recommendation engine 410 may obtain, for each pair of products in a set of product pairs, respective probability information. The products may, for example, be from a set of products for sale on a new online store, or from a set of products including both old and new products. The probability information may indicate, for a particular pair of products, a probability of that pair of products being purchased together. The probability information may be referred to as co-purchase probability information. In some embodiments, the probability information for a particular pair of products may be associated with that pair of products by a set of vector pairs corresponding to those products. That is, the probability information may be associated with the set of vector pairs (e.g. as shown in FIG. 8). Thus, for example, the probability information may indicate, for each vector pair in a set of vector pairs, a probability of the products corresponding to that vector pair being purchased together. In some embodiments, the probability information may be associated with identifiers for the pairs of products (e.g. as shown in FIG. 9).

The recommendation engine 410 may obtain the probability information by receiving the probability information from another entity, such as another entity in an e-commerce platform. The recommendation engine 410 may obtain the probability information by determining the probability information. For example, the recommendation engine 410 may perform the steps of the method 700 described above to obtain the co-purchase probability information for products in the set of products. In some embodiments, the recommendation 410 may retrieve the product information from a memory (e.g. the memory 418).

In step 1004, the recommendation engine 410 receives, from the user device 450, an indication that a customer intends to purchase a particular product in the set of products. In other embodiments, the indication may merely be that the customer has loaded a particular webpage (e.g. a product webpage). The recommendation engine 410 may receive the indication over the network 430, for example. The user device 450 may, for example, send an identifier (e.g. a product title, a stock keeping unit, SKU, number etc.) for the particular product to the recommendation engine in step 1004. The user device 450 may send, to the recommendation engine 410, a request for a recommendation for a product to suggest for the user to purchase with the particular product.

Figure 11:
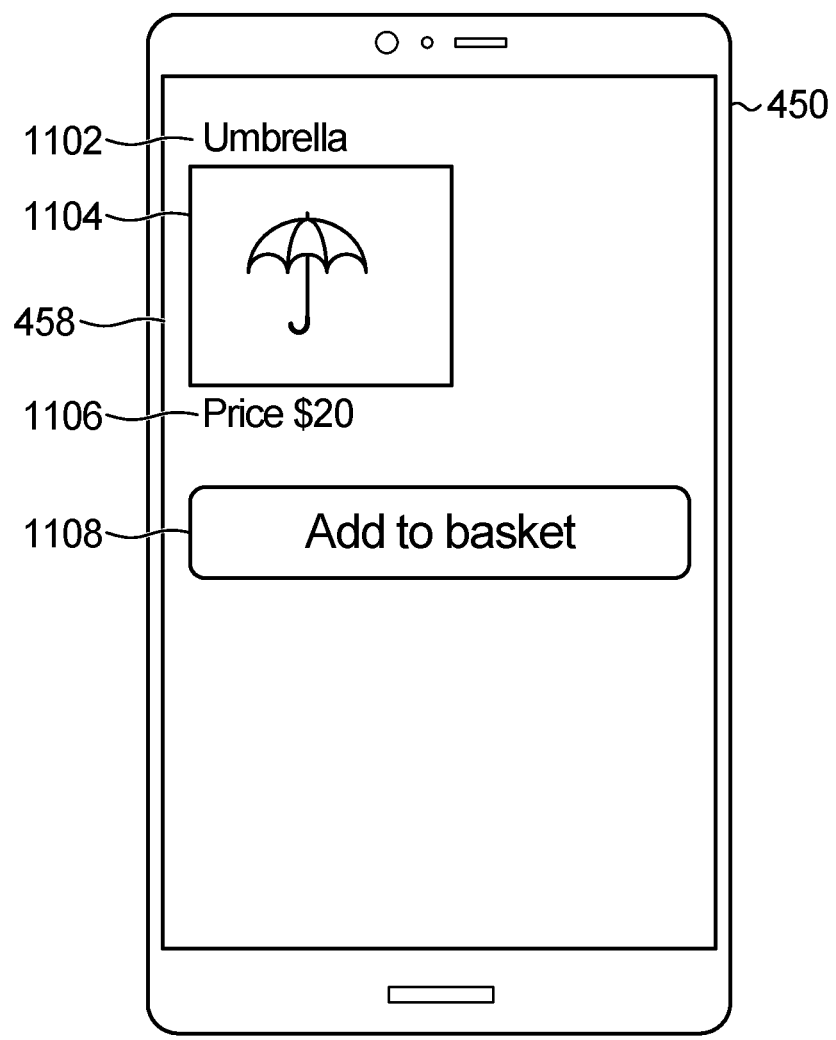
FIGS. 11 and 12 show examples of a user device according to embodiments of the disclosure.

The user device 450 may send the indication to the recommendation engine 410 in response to an interaction with the customer. An example of this may be described with respect of FIG. 11, which shows the user device 450 according to one embodiment. In this embodiment, the user interface 458 of the user device 450 includes a display screen on which product information for an umbrella is being displayed to a customer, e.g. on a product webpage for the umbrella. As illustrated, the product information includes a product title 1102 ("Umbrella"), a product image 1104 (an image of an umbrella), a product price 1106 ($20). An "Add to basket" button is displayed underneath the product information. The customer may click the "Add to basket" button to add the umbrella to a cart for purchase. The addition of the umbrella to the cart may indicate that the customer intends to purchase the umbrella. In response to the customer clicking the "Add to basket" button, the user device 450 may send an indication to the recommendation engine 410 that the customer intends to purchase the umbrella. The indication may include an identifier for the umbrella, such as the product title ("Umbrella), and/or a SKU for the umbrella etc. Additionally or alternatively, the user device 450 may send the indication to the recommendation engine 410 automatically (i.e. rather than in response to a particular interaction with the customer). For example, the user device 450 may send the indication (e.g. that the customer has loaded a particular webpage) upon and/or shortly after the user device 450 loading the user interface 458, the product webpage, and/or a specific portion of the product webpage.

In step 1006, the recommendation engine 410 may determine, based on the probability information, a recommendation for a product to be suggested for the user to purchase with the particular product. In some embodiments, the probability information may be associated with the numeric vectors in the vector pairs and the recommendation engine 410 may, for each vector pair in the set of products, associate the probability information for that vector pair with the identifiers of the products corresponding to that vector pair. In some embodiments, the association step may be omitted. For example, the probability information obtained in step 1002 may already be associated with identifiers for the products (e.g. as in FIG. 9). Additionally or alternatively, the recommendation may be determined at an earlier time (e.g. in response to a previous indication from the same customer, a different indication from a different customer, and/or as part of an initialization or refresh routine for the recommendation engine 410) and cached for later retrieval (e.g. using one or more product identifiers as cache keys).

The product recommendation may indicate one or more products to be suggested to the user. In some embodiments, the recommendation engine 410 may determine the product to be suggested to the user for purchase with the particular product by identifying product pairs that include the particular product and identifying, within those product pairs, the N pairs that are associated with the highest probability of being purchased together according to the product information. N may be any suitable integer, such as N=1, 2, 5, 10 etc. The recommendation engine 410 may thus identify the N products which are most likely to be purchased with the particular product.

The product recommendation may include identifiers for the one or more products to be suggested to the user. The product recommendation may include product information for the one or more products such as a title, category, product description, image etc. The product information for the one or more products may be defined in the same way as the product information obtained in steps 502 and 704 described above, except that is in respect of the one or more products rather than the set of products.

In step 1008, the recommendation engine 410 sends the product recommendation to the user device 450 for output to the customer at the user interface 458. In FIG. 10, the recommendation engine 410 sends the product recommendation to the user device 450 (e.g. over the network 430). In some embodiments, the recommendation engine 410 may send the product recommendation to another entity for output to the customer at the user interface 458 of the user device 450. The other entity may send the product recommendation to the user device 450. In some embodiments, the other entity may, based on the product recommendation, generate content corresponding to a web page for display on the user interface 458 of the user device 450, in which the web page includes the product recommendation. The content may include instructions for providing the web page such as HTML defining the web page, Cascading Style Sheets (CSS), template language, JavaScript, and the like, and/or any combination thereof. The entity may send the content to the user device 450 for display on the user interface 458. The entity generating the web page content may be implemented by the same processor that implements the recommendation engine 410, e.g. both implemented by a same server. In general, the recommendation engine 410 may provide the product recommendation for output at the user interface 458 of the user device 450, either directly or via another entity.

Figure 12:
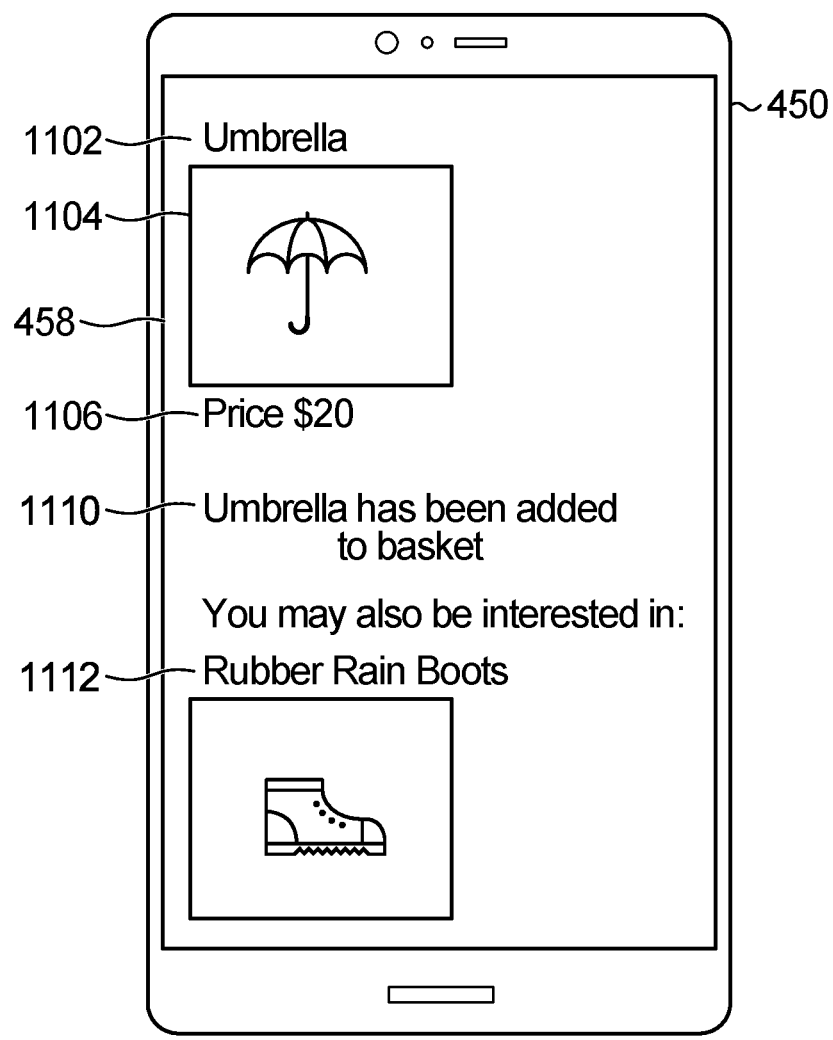

In step 1010, the user device 450 outputs the product recommendation to the customer at the user interface 458. The user device 450 may, for example, output product information (e.g. a title, product description, image, price etc.) for the one or more products indicated in the product recommendation at the user interface. An example of this may be described with respect of FIG. 12, which shows the output of a product recommendation 1112 at the user interface 458 of the user device 450 after sending the indication to the recommendation engine 410 that the customer intends to purchase the umbrella in response to the customer clicking the "Add to basket" button 1108. In FIG. 12, the "Add to basket" button 1108 shown in FIG. 11 has been replaced by text 1110 stating that the umbrella has been added to the customer's basket (alternatively called the customer's cart). The product recommendation 1112 includes text indicating that the product may be of interest to the customer ("You may also be interested in"), a title of the recommended product ("Rubber Rain Boots") and an image of the recommended product.

In some embodiments, step 1002 may be performed in advance. This may enable the performance of the rest of the method 1000 in real-time. Thus, for example, steps 1004-1010 may be performed in real-time (e.g. responsive to an action performed by the customer on the user device 450). In some embodiments, step 1002 may be performed at particular time intervals. For example, step 1002 may be performed once each day. Performing step 1002 at time intervals may enable the product recommendations to be kept up to date with changes to e.g. products for sale and/or product information whilst enabling the rest of the method 1000 to be performed in real-time. In some embodiments, step 1002 may also be performed in real-time. In some embodiments, step 1002 may be performed responsive to step 1004 (e.g. after and in response to step 1004). For example, the recommendation engine 410 may, responsive to receiving an indication that a customer intends to purchase a particular product in step 1104, obtain probability information for a set of vector pairs in step 1102. In some embodiments, each of the vector pairs may include the numeric vector corresponding to the particular product. Thus, the recommendation engine 410 may limit the scope of the probability information to indicate the probability of other products being purchased together with the particular product.

Using a Machine-Learning Model to Predict the Probability of an Item being Part of a Group In some embodiments, one or more of the methods described herein (e.g. the method 500, 700 etc.) may be used to predict the probability (e.g. likelihood) of an item being a part of a particular group (e.g. based on a known grouping). The item may be, for example, a product. A machine-learning model for predicting the likelihood of an item being a part of a particular group may be trained according to the method 500 described above, but using a set of items instead of the set of products and labelling the vector pairs according to whether the items corresponding to the vector pair belong to a same group. The co-purchase frequency information may be omitted, for example. In order to predict the probability of a particular item being a part of a particular group, vector pairs may be input to the trained machine-learning model, in which each of the vector pairs includes the numeric vector for the particular item and the numeric vector for a respective other item. The machine-learning model may output, based on the vector pairs, a probability of the items corresponding to each vector pair belonging to the same group. Thus, in general, the methods described herein may be applied more generally to determine whether an item (e.g. a single item) is likely to be part of a group based on a known grouping, e.g., as characterized by a vectorization scheme.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
    encoding, for each product in a first set of products, respective product information to obtain a respective numeric vector for that product;
    pairing the numeric vectors to obtain a first set of vector pairs, each vector pair in the first set of vector pairs corresponding to a respective pair of products from the first set of products;
    obtaining a machine-learning model that is trained, wherein the machine-learning model was trained by:
        encoding, for each product in a second set of products, respective product information to obtain a respective numeric vector for that product;
        pairing the numeric vectors for the second set of products to obtain a second set of vector pairs, each vector pair in the second set of vector pairs corresponding to a respective pair of products in the second set of products;
        labelling the second set of vector pairs to obtain, for each vector pair in the second set of vector pairs, a label indicative of whether or not the respective pair of products associated with the vector pair have been purchased together;
        creating a training set using the set of labels and the second set of vector pairs, wherein creating the training set comprises omitting, from the training set, at least some vector pairs in the second set of vector pairs that are associated with a label indicating that the respective pair of products have not been purchased together; and
        training the machine-learning model using the training set without the at least some vector pairs;

inputting the first set of vector pairs into the machine-learning model to obtain, for each pair in the first set of vector pairs, probability information indicating whether the respective pair of products corresponding to the respective vector pair are likely to be purchased together; and outputting the probability information for use in determining a product recommendation.

2. The computer-implemented method of claim 1, wherein training the machine-learning model using the training set comprises:

training the machine-learning model using the training set and co-purchase frequency information, the co-purchase frequency information indicating how frequently products have been purchased together.

3. The computer-implemented method of claim 2, wherein training the machine-learning model using the training set and co-purchase frequency information comprises training the machine-learning model using a loss function that is based on the co-purchase frequency information.

4. The computer-implemented method of claim 1, wherein the first set of products are from a first online store and the second set of products are from a second online store.

5. The computer-implemented method of claim 1, wherein the first set of products includes at least one product that is not in the second set of products.

6. The computer-implemented method of claim 1, wherein the machine-learning model comprises a neural network.

7. The computer-implemented method of claim 1, wherein, for each product in the first set of products, the product information comprises textual product information.

8. The computer-implemented method of claim 7, wherein, for each product in the first set of products, the respective numeric vector is based on one or more words in the textual product information for that product.

9. The computer-implemented method of claim 7, wherein, for each product in the first set of products, the respective numeric vector is based on a meaning of a sequence of words in the textual product information for that product.

10. The computer-implemented method of claim 7, wherein the machine-learning model comprises a first machine-learning model and wherein encoding, for each product in the first set of products, the respective textual product information to obtain the respective numeric vector for that product comprises:

encoding, for each product in the first set of products, the respective textual product information with a second machine-learning model that uses transfer learning via sentence embeddings to obtain the respective numeric vector for that product.

11. The computer-implemented method of claim 1, further comprising:

receiving, from a user device over a network, an indication that a customer intends to purchase a particular product in the first set of products, the first set of vector pairs including at least one vector pair that includes the numeric vector for the particular product; and based on the probability information for the at least one vector pair, providing the product recommendation for output to the customer at a user interface of the user device.

12. The computer-implemented method of claim 1, wherein pairing the numeric vectors to obtain a first set of vector pairs comprises, for each vector pair in the first set of vector pairs:

concatenating a first numeric vector in the vector pair and a second numeric vector in the vector pair.

13. A system comprising:

a memory to store a machine-learning model; and a processor to:

encode, for each product in a first set of products, respective product information to obtain a respective numeric vector for that product;

pair the numeric vectors to obtain a first set of vector pairs, each vector pair in the first set of vector pairs corresponding to a respective pair of products from the first set of products;

access the machine-learning model, wherein the machine-learning model was trained by:

encoding, for each product in a second set of products, respective product information to obtain a respective numeric vector for that product;

pairing the numeric vectors for the second set of products to obtain a second set of vector pairs, each vector pair in the second set of vector pairs corresponding to a respective pair of products in the second set of products;

labelling the second set of vector pairs to obtain, for each vector pair in the second set of vector pairs, a label indicative of whether or not the respective pair of products associated with the vector pair have been purchased together;

creating a training set using the set of labels and the second set of vector pairs, wherein creating the training set comprises omitting, from the training set, at least some vector pairs in the second set of vector pairs that are associated with a label indicating that the respective pair of products have not been purchased together; and training the machine-learning model using the training set without the at least some vector pairs;

input the first set of vector pairs into the machine-learning model to obtain, for each pair in the first set of vector pairs, probability information indicating whether the respective pair of products corresponding to the respective vector pair are likely to be purchased together; and output the probability information for use in determining a product recommendation.

14. The system of claim 13, wherein the first set of products are from a first online store and the second set of products are from a second online store.

15. The system of claim 13, wherein, for each product in a first set of products, the product information comprises textual product information and the respective numeric vector is based on a meaning of a sequence of words in the textual product information for that product.

16. A non-transitory computer readable medium having stored thereon computer-executable instructions that, when executed by a computer, cause the computer to perform operations comprising:

encoding, for each product in a first set of products, respective product information to obtain a respective numeric vector for that product;

pairing the numeric vectors to obtain a first set of vector pairs, each vector pair in the first set of vector pairs corresponding to a respective pair of products from the first set of products;

obtaining a machine-learning model that is trained, wherein the machine-learning model was trained by:
  encoding, for each product in a second set of products, respective product information to obtain a respective numeric vector for that product;
  pairing the numeric vectors for the second set of products to obtain a second set of vector pairs, each vector pair in the second set of vector pairs corresponding to a respective pair of products in the second set of products;
  labelling the second set of vector pairs to obtain, for each vector pair in the second set of vector pairs, a label indicative of whether or not the respective pair of products associated with the vector pair have been purchased together;
  creating a training set using the set of labels and the second set of vector pairs, wherein creating the training set comprises omitting, from the training set, at least some vector pairs in the second set of vector pairs that are associated with a label indicating that the respective pair of products have not been purchased together; and
  training the machine-learning model using the training set without the at least some vector pairs;
inputting the first set of vector pairs into the machine-learning model to obtain, for each pair in the first set of vector pairs, probability information indicating whether the respective pair of products corresponding to the respective vector pair are likely to be purchased together; and
outputting the probability information for use in determining a product recommendation.

17. The system of claim 13, wherein training the machine-learning model using the training set comprises:
  training the machine-learning model using the training set and co-purchase frequency information, the co-purchase frequency information indicating how frequently products have been purchased together.

18. The system of claim 17, wherein training the machine-learning model using the training set and co-purchase frequency information comprises training the machine-learning model using a loss function that is based on the co-purchase frequency information.

19. The system of claim 13, wherein, for each product in the first set of products, the product information comprises textual product information.

20. The system of claim 19, wherein the machine-learning model comprises a first machine-learning model and wherein the processor is to encode, for each product in the first set of products, the respective textual product information to obtain the respective numeric vector for that product by performing operations including:
  encoding, for each product in the first set of products, the respective textual product information with a second machine-learning model that uses transfer learning via sentence embeddings to obtain the respective numeric vector for that product.

* * * * *